United States Patent
Reyhanloo (10) Patent No.: US 9,301,638 B2
(45) Date of Patent: Apr. 5, 2016

(54) DRINK PREPARATION MACHINE

(75) Inventor: Shahryar Reyhanloo, Lohn-Ammansegg (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 224 days.

(21) Appl. No.: 12/768,215

(22) Filed: Apr. 27, 2010

(65) Prior Publication Data
US 2010/0288135 A1   Nov. 18, 2010

(30) Foreign Application Priority Data
May 18, 2009   (EP) ..................................... 09405081

(51) Int. Cl.
*A47J 31/00*   (2006.01)
*A47J 31/44*   (2006.01)

(52) U.S. Cl.
CPC .......... *A47J 31/4403* (2013.01); *A47J 31/4407* (2013.01)

(58) Field of Classification Search
CPC .......................... A47J 31/4407; A47J 31/4403
USPC ....... 99/275, 279, 280, 289 R, 290, 295, 300, 99/302 R, 306, 307, 323.2; 219/494, 601, 219/649, 620, 600; 454/256, 355; 34/54, 34/63, 133, 286
See application file for complete search history.

(56) References Cited

U.S. PATENT DOCUMENTS

| | | | | |
|---|---|---|---|---|
| 4,325,191 A * | 4/1982 | Kumagai et al. | ................. | 34/571 |
| 5,251,541 A * | 10/1993 | Anson et al. | .................... | 99/280 |
| 6,881,139 B2 * | 4/2005 | Yang | .............................. | 454/155 |
| 2004/0105922 A1 * | 6/2004 | Moon et al. | .................... | 426/466 |
| 2004/0176022 A1 * | 9/2004 | Thrasher et al. | .............. | 454/256 |

FOREIGN PATENT DOCUMENTS

| | | | |
|---|---|---|---|
| CN | 201213432 Y | 4/2009 | |
| WO | WO-2007/082888 A1 | 7/2007 | |
| WO | WO2007082888 A1 * | 7/2007 | ............ A47J 31/057 |

OTHER PUBLICATIONS

European Search Report from corresponding European Patent Appl. No. 09405081.2, dated Oct. 16, 2009.
Search Report from European Patent Application No. 10005001.2 dated Jul. 20, 2010.

* cited by examiner

*Primary Examiner* — Phuong Nguyen
(74) *Attorney, Agent, or Firm* — Alston & Bird LLP (57) ABSTRACT

Provided is a drink preparation machine with an outer housing, which contains at least one ventilation element for ventilating an interior which is enclosed by the outer housing. In order to reduce the likelihood of penetration by dust, water and/or small objects, to allow simple and quick cleaning with reduced use of detergents and to achieve energy-saving operation of the drink preparation machine, the at least one ventilation element can be actuated to open and close.

16 Claims, 4 Drawing Sheets

DRINK PREPARATION MACHINE

CROSS-REFERENCE TO RELATED APPLICATIONS

This application claims priority to European Patent Application No. 09405081.2, filed May 18, 2009, which is incorporated herein in its entirety by reference.

FIELD OF THE INVENTION

The invention relates to the technical field of drink preparation machines and in particular to the field of ventilating an interior space, which is enclosed by an outer housing, of the drink preparation machine.

BACKGROUND

Drink preparation machines are known which allow different drinks such as coffee, espresso, hot chocolate etc. to be purchased. Such drink preparation machines also include what are known as fully automatic coffee machines in which coffee beans and optionally water are kept available and which, at the push of a button, grind the coffee beans in their own grinder, press the coffee powder into a brewing module, add heated water and brew fresh coffee from it.

Ventilation slots are conventionally made in an outer housing which surrounds an interior of drink preparation machines for ventilation. This ensures that the moisture can escape from the interior and that heat which is generated in particular by a heating element can likewise escape from the interior so that individual components in the interior are not overheated. This ventilation can take place by thermal convection, during which outer air is sucked into the interior through ventilation slots which are arranged in the lower region or on the baseplate of the drink preparation machine, flows past the components of the drink preparation machine and absorbs moisture and heat in the process, and then escapes to the outer environment through ventilation slots which are arranged in the upper region of the outer housing. This ventilation can however be made to take place by means of fans or ventilators. Conducting moisture away from the interior is very important to forestall mold formation, which is to be prevented in particular on components which are in contact in some way with foods, for example the coffee beans, coffee powder, water and the brewed coffee.

As described above, sufficient ventilation through ventilation slots, which can also be referred to as ventilation elements, is very important. A disadvantage of these ventilation slots consists in that dust, water or relatively small objects can penetrate unintentionally into the interior through these ventilation slots.

The unintentional penetration of water through ventilation slots which are arranged in an upper region of the outer housing or on the upper closure lid of the outer housing is in particular a frequent scenario, as many drink preparations machines contain a water tank which must be refilled regularly with water. If the user is not paying attention, water can unintentionally flow very quickly through these ventilation slots into the interior. Even if the sensitive control electronics are mostly arranged in a lower, protected region of the drink preparation machine, the probability quickly arises that the water also finds its way to the control electronics and causes a short circuit on the usually unprotected circuit board, which triggers an immediate and long-lasting fault, especially with complex IC modules. Many lead cables which conduct high voltage, the connectors of which are usually unprotected, also run in the interior. Entering water can also trigger a short circuit immediately here, which in the best case can result in a high voltage fuse being triggered, but in an unfavorable scenario can also lead to a fault in individual electrical modules.

The penetration of dust has a disadvantageous effect on the ventilation of the interior, as the dust particles can easily stick to the ventilation slots and close them up over time, especially as a consequence of the moisture in the interior, which then leads to insufficient ventilation of the interior.

The inadvertent penetration of objects into the interior can lead to mechanical malfunctions. For example, the penetration of an object into the threaded spindle region of the brewing module can lead to this object getting into a gear mesh during operation of the brewing module and preventing operation or even causing mechanical damage there.

A further disadvantage of ventilation slots consists in that the visual design of drink preparation machines is limited by the need for them. Industrial designers of drink preparation machines cannot therefore give their design ideas free rein, as the provision of ventilation slots has been a technical necessity until now. The industrial design of drink preparation machines has an increasing promotional influence, and ventilation slots blend visually into the design concept less and less. Current design concepts are based increasingly on the outer housing having surfaces which are as smooth as possible with as few interruptions as possible, as this corresponds increasingly with the tastes of the customers.

Cleaning is also made easier by smooth surfaces. Buttons and switches are therefore largely replaced by touch-sensitive sensors which are arranged behind a smooth surface in order to make cleaning easier. This design concept has run up against its limits until now with the ventilation slots, as they cannot be omitted. The ventilation slots therefore foil the efforts of the industrial designer to provide surfaces which are as smooth, flat and continuous as possible, fit visually into the design concept and are quick and simple to clean.

A further disadvantage of conventional ventilation slots consists in that waste heat which is generated for example temporarily by the heating element, escapes permanently unused. Although excess heat must be conducted out of the interior as described above, an excessively designed removal of heat can lead to excessive cooling, for example of the heating element which keeps hot water constantly available when the drink preparation machine is switched on. This heat is conducted away excessively with the result that the heating element must be reheated more often than necessary, as a result of which much energy is consumed.

SUMMARY OF THE INVENTION

An advantage of the present invention consists in that the ventilation element is opened as briefly as possible in order to reduce the likelihood of penetration by dust, water or objects, to provide flat and continuous surfaces which can be cleaned quickly and easily and to prevent excessive removal of heat, as a result of which energy is saved.

This is realized by a drink preparation machine according to the claims, which provides a drink preparation machine with an outer housing which contains at least one ventilation element for ventilating an interior which is enclosed by the outer housing, wherein the at least one ventilation element can be actuated to open and close.

An essential point of the invention consists in that the at least one ventilation element can be actuated to open and close.

Advantageous developments of the drink preparation machine are specified in the dependent claims.

In a preferred embodiment, the at least one ventilation element can be actuated to open variably. This means that the opening extent of the ventilation element can be adjusted variably as a function of the operating state. In this case the ventilation element is closed when the drink preparation machine is switched off for a long time. When the drink preparation machine is switched on, the ventilation element can on the other hand be opened completely or partially as a function of the temperature and/or moisture of the interior. In this case, the ventilation element can be opened in the event of an excessively high temperature and/or moisture in the interior, for example caused by a completed drink preparation process during which much heat and moisture is generated, in order to conduct away heat and moisture. If the temperature and/or moisture in the interior has/have then after a certain time decreased so much that further removal can be reduced, the ventilation element will close by a certain amount. If after a further period no more removal is necessary, and if further removal of heat would even result in excessive cooling, in particular of the heating element, the ventilation element is completely closed.

In order to achieve removal of the heat and/or moisture which is as efficient as possible, the at least one ventilation element is arranged in an upper region of the outer housing. This means the heat which rises upwards can be removed most efficiently. The moisture is also efficiently removed by the suction effect.

The at least one ventilation element is preferably arranged in the upper closure lid of the outer housing. Heat and/or moisture are removed quickly and reliably from the interior with reduced eddy formation by means of this arrangement. The arrangement of the ventilation element in the upper closure lid of the outer housing increases the risk that in particular water and small objects could penetrate into the interior. However, because the ventilation element can be closed as a function of the operating state of the drink preparation machine and in particular as a function of the temperature and/or moisture prevailing in the interior, this likelihood is reduced to a minimum.

The outer side of the ventilation element is preferably formed in the closed state as a flat, continuous surface which connects to the adjacent outer surface of the outer housing. This means that the entire outer surface in the region of the ventilation element, in the closed state thereof, can be considered a uniformly smooth surface, which gives the industrial designer greater design freedom. Moreover, this region can be cleaned quickly, simply and with reduced use of detergent, for example just with a damp cloth, as no projecting or depressed regions are present to which dirt can easily adhere, which can only be removed with detergent and time-consuming cleaning.

At least one opening is preferably provided in the outer housing, with the at least one ventilation element and the at least one opening being arranged in such a manner that thermal convection of external air through the interior is produced when the ventilation element is opened. This produces a flow in the interior during which external air enters through the opening into the interior, flows along the objects of the drink preparation machine which are to be cooled, absorbing heat and moisture in the process, and then exits from the interior through the ventilation element.

In order to maximize the thermal convection of external air through the interior, the at least one opening is arranged in a lower region of the outer housing. This increases the temperature gradient which produces the thermal convection within the interior, as a result of which the flow of the external air through the interior is maximized. In order to achieve maximum flow, the at least one opening is arranged in the baseplate of the outer housing. This also increases the number of modules inside the interior along which the external air flows, and the electronic unit which is usually situated in the lower region of the drink preparation machine is also cooled. Moreover, the opening which is arranged in the baseplate is not visible, which often suits the design concept of the industrial designer. The opening which is arranged in the baseplate can also be used to drain any fluid which collects unintentionally from the interior before it causes any damage.

The at least one ventilation element is preferably actuated by an actuation member. This actuation member can be actuated electrically or non-electrically, for example by heat.

The actuation member is preferably a bimetal element. The bimetal element can actuate or adjust the opening and closing of the ventilation element as a function of temperature. At least one heating element or thermoblock for heating water is present in a drink preparation machine. The bimetal element is attached directly to this heating element at a suitable point. If the heating element heats up, this leads to a rise in the temperature and/or moisture in the interior, which is/are to be removed. In this state, the opening of the ventilation element is desirable. The bimetal element attached to the heating element is likewise heated in this state and produces a change in shape. This change in shape causes a movement of the bimetal element, which is then transmitted mechanically to the ventilation element. The ventilation element is thus opened and closed as a function of the change in shape of the bimetal element, caused by the heating and cooling of the heating element, and thus as a function of the temperature and/or moisture in the interior. No electrical actuation is necessary for this, as a result of which the reliability is increased, no additional wiring is required and costs are reduced overall. The variable opening of the ventilation element is also achieved in a simple manner, as the change in shape of the bimetal element is likewise variable as a function of the temperature applied. If the heating of the heating element is interrupted, the bimetal element returns to its original shape. The ventilation element is closed again by this movement. Spring elements can be provided in the ventilation element, which exert a pressure force which assists the closing of the ventilation element.

The bimetal element preferably has a heating wire wound around it and can be electrically actuated. This embodiment can then take effect if the distance between the ventilation element and the heating element is so great that a conventional bimetal element cannot be interposed. This arrangement of a bimetal element with a heating wire wound around it can then be arranged on the ventilation element as an actuation member. Instead of a heating wire, any other desired heating device can also be provided. In the event that an opening of the ventilation element is necessary, a current flows through the heating wire, which then heats up, and its heating then causes the change in shape of the bimetal element. This change in shape in turn causes a movement of the bimetal element, which is transmitted mechanically to the ventilation element. The current flowing through the heating wire can be varied which has the result that the opening extent of the ventilation element is set variably depending on requirements. In the event that the ventilation element is to be closed again, the supply of current through the heating wire is interrupted, whereupon the bimetal element returns to its original shape. The ventilation element is closed again by this movement. In this case too, spring elements can be provided in the ventilation element, which exert a pressure force which assists the closing of the ventilation element.

The actuation member is preferably an electrical drive motor. This electrical drive motor can be a stepping motor which transmits a linear or rotary force to open the ventilation element. It is thereby also possible to open or close the ventilation element only partially.

The actuation member is preferably a piezoelectric actuator. Such a piezoelectric actuator executes a deformation depending on an applied voltage, which causes a movement, which is mechanically transmitted to the ventilation element.

The actuation member can preferably be an electromagnet. An electromagnet exerts an electromagnetic force on a metal element when actuated electrically. This force can be transformed into a movement, which is then transmitted mechanically to the ventilation element.

The actuation member is preferably formed to actuate the ventilation element in response to an operating state of the drink preparation machine. In a simple embodiment this actuation can be such that the ventilation element opens as soon as the drink preparation machine is switched on and only closes again when the drink preparation machine is switched off. This process can also take place in a time-delayed manner in each case, after the machine has cooled down sufficiently.

In a preferred embodiment, the actuation member is formed so that it can be actuated electrically in response to a control program which can be executed in a control unit of the drink preparation machine. In this configuration only actuation members can be used which can be actuated electrically. Of the above-listed examples of actuation members, the simple bimetal element for example does not therefore come into consideration. The electrical actuation of the actuation member in response to control program can provide a much more efficient actuation of the ventilation element than a mere opening and closing as a function of the process of switching on the drink preparation machine. In this case the control program can make possible a more complex and more efficient actuation of the ventilation element as a function of values, for example the temperature and/or the moisture in the interior, which are supplied to the control unit.

The control program is preferably formed to actuate the actuation member as a function of a time function and/or threshold function. With the aid of a time function, processes for opening and closing the ventilation element are not executed immediately when the temperature and/or moisture in the interior exceeds or falls below certain values. The processes are rather executed after the expiry of a time span predefined by the time function. During this time span or delay time, the ventilation element is left unchanged, although corresponding signals for actuation may be present. Opening and closing of the ventilation element is thus reduced to an acceptable amount. The same advantage can be achieved by opening and closing the ventilation element as a function of a threshold function. In this case the ventilation element is for example opened when the temperature in the interior exceeds a first threshold. If the temperature in the interior then falls, the ventilation element is only closed again when the temperature in the interior falls below a second threshold, with the second threshold being lower than the first threshold. The same procedure can be carried out alternatively or additionally with respect to the moisture in the interior.

The control program is preferably formed to actuate the actuation member as a function of signals input from at least one sensor. One or a plurality of sensors can be arranged at relevant positions in the interior so that the control unit also always receives relevant input values.

The at least one sensor is preferably a temperature and/or moisture sensor. These sensors measure the variables relevant for the drink preparation machine. Sensors can also be provided which measure other physical variables.

The at least one ventilation element is preferably arranged in the upper closure lid of the outer housing, and a flat continuous surface element which contains openings is arranged above the ventilation element. This configuration proves advantageous if a variable appearance, that is, the open or closed ventilation element, of the outer housing is not desired for design reasons. The ventilation element is then covered by the flat, continuous surface element. The openings in the flat, continuous surface element ensure sufficient ventilation when the ventilation element is open. A further advantage consists in that drink containers, for example cups or mugs, can be placed for a long time on the flat, continuous surface element, which are then preheated by the waste heat exiting from the interior of the drink preparation machine.

The already mentioned advantage of the present invention is also achieved by a ventilation element for ventilating an interior, which is enclosed by an outer housing, of a drink preparation machine, which ventilation element can be actuated to open and close.

An essential point of the invention consists in the particularly simple structure of the ventilation element, which can be actuated mechanically or electrically.

The above advantage of the present invention is also achieved by a method for ventilating an interior, which is enclosed by an outer housing, of a drink preparation machine by means of a ventilation element, in which the at least one ventilation element is actuated to open and close. This method is characterized by its simple and efficient process and can be constructively realized in a particularly simple and cost-effective manner.

BRIEF DESCRIPTION OF THE DRAWINGS

The present invention is explained in more detail below using an exemplary embodiment with reference to the attached figures. Parts which are the same or act the same are referred to with the same reference numerals. In the figures.

DETAILED DESCRIPTION

Figure 1A:
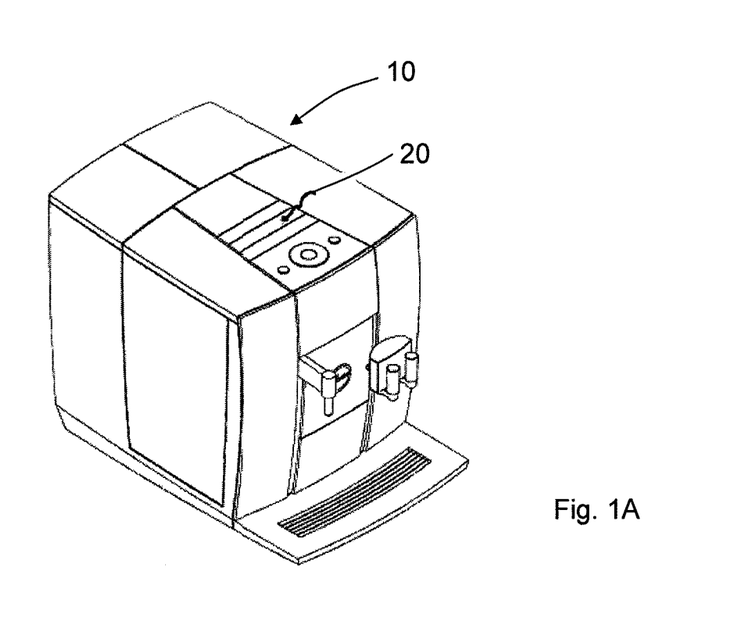
FIGS. 1A, 1B show a perspective view of a drink preparation machine with an inserted ventilation element, in a front view (FIG. 1A) and in a view from below (FIG. 1B)
Figure 1B:
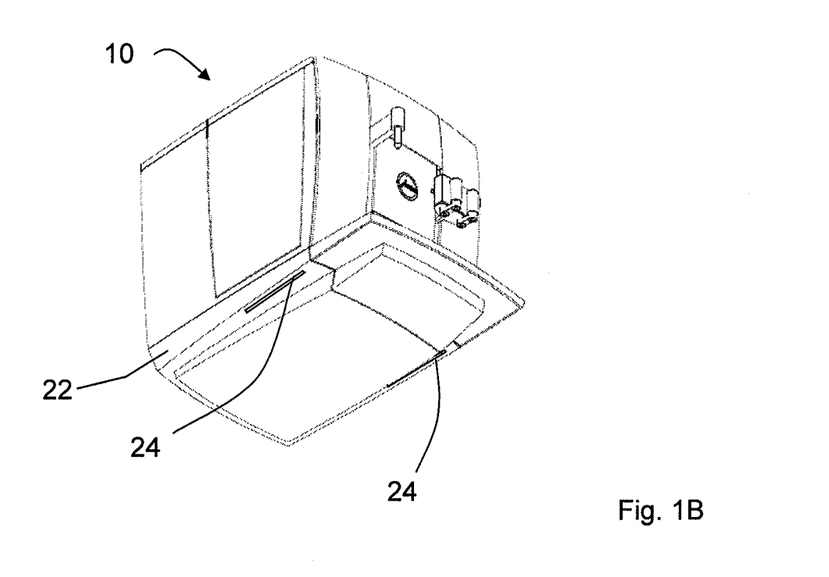

FIGS. 1A, 1B in each case show a perspective view of a drink preparation machine 10 with a ventilation element 20 which is arranged in an upper closure lid of the outer housing, in a front view (FIG. 1A) and a view from below (FIG. 1B). The drink preparation machine 10 is configured in this example as a fully automatic coffee machine. The ventilation element 20 is shown in a closed state. In this example the ventilation element 20 can be closed because the drink preparation machine 10 is switched off or the temperature and/or moisture prevailing in the interior are/are below values at which no ventilation is necessary, even when the drink preparation machine 10 is switched on.

FIG. 1A shows the drink preparation machine 10 with a coffee outlet opening and milk foaming nozzle arranged on the front. A collecting screen is provided below the coffee outlet opening and milk foaming nozzle, onto which a drinking vessel can be placed, and which allows any excess liquids to flow through and be collected in a collecting pan.

The outer housing of the drink preparation machine 10 can (optionally) be equipped with one or a plurality of openings in addition to the ventilation element 20. The respective openings make it possible to influence air flows in the interior of the drink preparation machine, depending on the flow cross section of the respective opening. For example, the flow speed or the flow direction of the air flowing in each case can be influenced and optimized as required by suitable selection of the arrangement of the respective opening and/or the respective size of the flow cross section of the respective opening.

The present example shows how the outer housing of the drink preparation machine 10 can be equipped in addition to the ventilation element 20 with one or a plurality of openings which are arranged in a lower region of the outer housing. As shown in FIG. 1B, the underside of the outer housing of the drink preparation machine 10 is formed by a baseplate 22 which has a plurality of openings 24 (in the form of slots in the present example). Air can penetrate through the openings 24 into the interior of the drink preparation machine 10, flow through the interior of the drink preparation machine 10 and advance to the ventilation element 20.

The arrangement of the openings 24 has the advantage that air can flow through the entire interior of the drink preparation machine 10 and thus the volume included by the respective air flow is maximized. Furthermore, the ventilation of the interior of the drink preparation machine 10 is improved, in particular with regard to a supply with fresh air, which can preferably penetrate through the openings 24. It should be pointed out that a correspondingly advantageous supply of air can also be achieved by means of one or a plurality of openings, which, in contrast to the openings 24, can be formed in other regions of the outer housing, for example in a side wall or the rear wall, rather than in the baseplate 22.

Figure 2A:
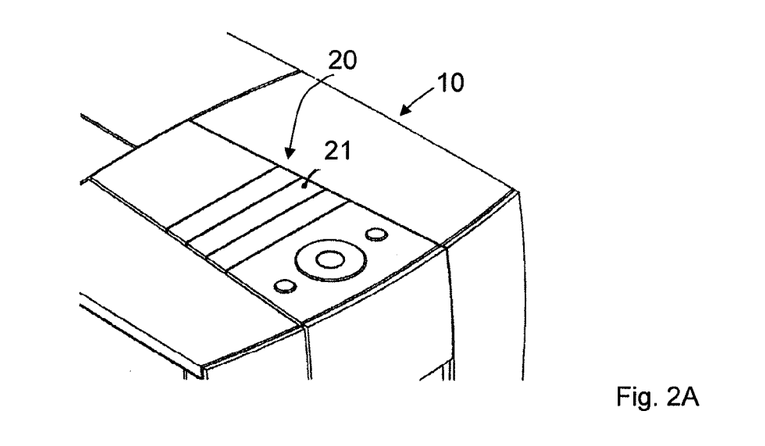
FIGS. 2A, 2B show an enlarged perspective detailed view of the drink preparation machine, with a closed ventilation element and an open ventilation element respectively.
Figure 2B:
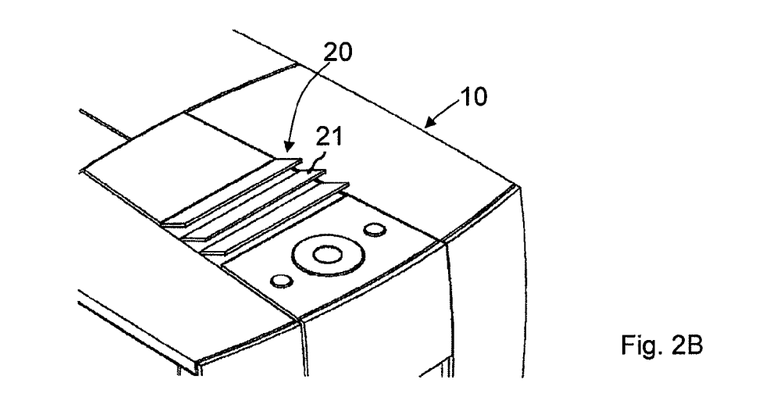

FIGS. 2A, 2B in each case show a partial enlargement of the drink preparation machine 10, with FIG. 2A showing the ventilation element 20 in the closed state and FIG. 2B showing the ventilation element 20 in the open state. In this example the ventilation element 20 contains three pivoting flaps 21, which in the open state are pivoted open about their own pivot axis. More or fewer pivoting flaps 21 can however also be provided. The position of the pivoting axes is selected in each case in such a manner that an air flow which is as free from eddies as possible is produced in the interior by thermal convection. In the closed state of the ventilation element 20, the respective outer sides of the pivoting flaps 21 together with the upper closure lid of the outer housing form a flat and continuous surface. The entire upper closure lid can thus be cleaned quickly and simply and with reduced use of detergents.

The particular advantage lies in that, in the closed state of the ventilation element 2, no dust enters the interior, deposits there on components and leads to blockage of openings, for example in the base region. Moreover, water or small objects can no longer penetrate unintentionally into the interior. The pivoting flaps 21 are only opened in a state in which heat and/or moisture must be conducted out of the interior (see FIG. 2B). Otherwise the pivoting flaps 21 are closed (see FIG. 2A), as a result of which the probability of dust, water and/or small objects is greatly reduced overall. The closed ventilation element 20, which together with the upper closure lid of the outer housing forms a flat and continuous surface, suits the tastes of the customers from a design standpoint, so that a promotional effect is achieved. In addition waste heat, which is generated for example temporarily by the heating element, is prevented from escaping permanently without being used.

Figure 2C:
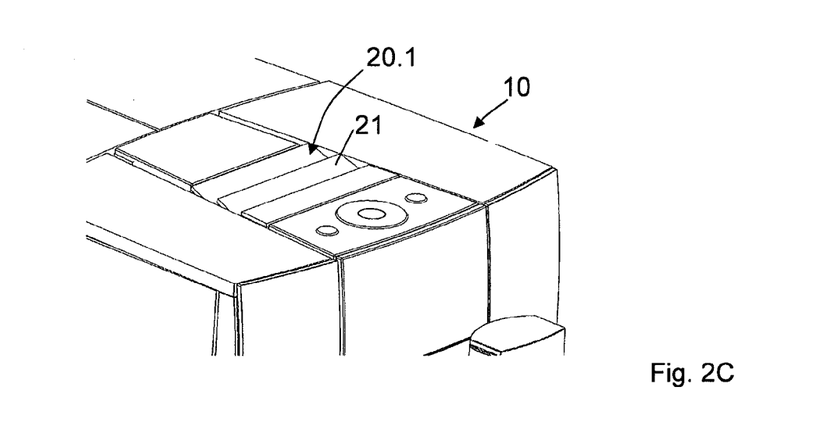
FIG. 2C shows an enlarged perspective detailed view of the drink preparation machine as in FIG. 2B, but with a different embodiment of the ventilation element, with the ventilation element being shown in an open state.

FIG. 2C shows (similarly to FIGS. 2A and 2B) a section of the drink preparation machine 10, with however the ventilation element 20 according to FIGS. 2A and 2B being replaced by a ventilation element 20.1, which like the ventilation element 20 has a plurality of pivoting flaps 21 which can be pivoted to open or close the ventilation element 20.1 about a pivot axis. In the closed state of the ventilation element 20.1, the respective outer sides of the pivoting flaps 21 together with the upper closure lid of the outer housing form a flat and continuous surface (as in the case of the ventilation element 20). In order to open to ventilation element 20.1, the pivoting flaps 21 can however be pivoted towards the interior of the drink preparation machine 10 (FIG. 2C), whereas in the case of the ventilation element the pivoting flaps 21 can be pivoted outwards for the purpose of opening (FIG. 2B). The ventilation elements 20 and 20.1 are functionally essentially equivalent. The ventilation element 20.1 merely has the advantage that its pivoting flaps 21 do not project beyond the outer surface of the outer housing of the drink preparation machine 10 even in the open state and therefore are better protected from damage than the pivoting flaps 21 of the ventilation element 20.

Of course, ventilation elements of another design, which allow at least control of an exchange of air between the interior and the outer environment of the drink preparation machine 10 can be used in the context of the invention instead of the ventilation elements 20 or 20.1. For the sake of simplicity, the drink preparation machine 10 which is equipped with the ventilation element 20 will be used as the example in the considerations below.

Figure 3A:
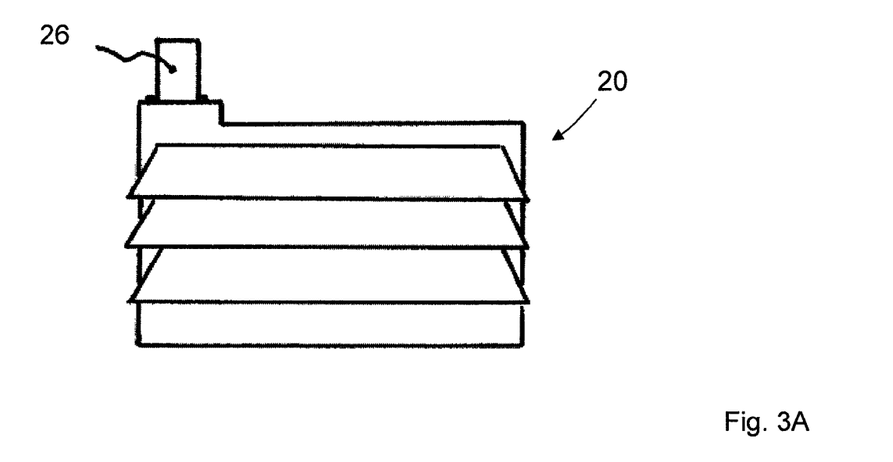
FIGS. 3A, 3B show a plan view of the ventilation element, in an open (FIG. 3B) and closed state (FIG. 3A) respectively.
Figure 3B:
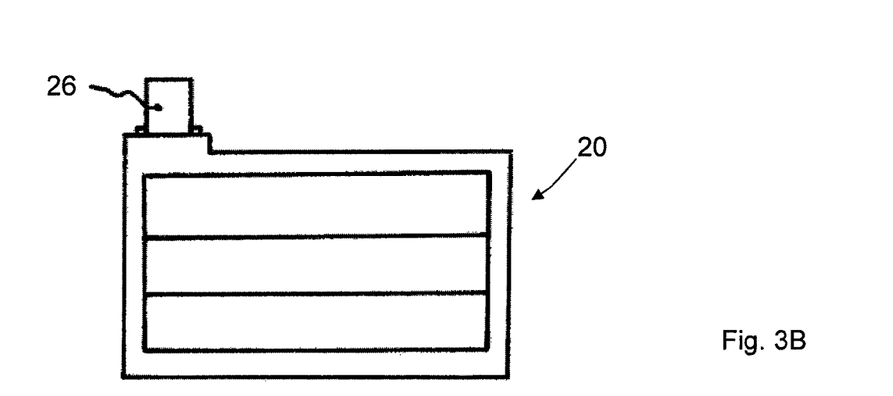

FIGS. 3A and 3B in each case show the ventilation element 20 in a plan view. In FIG. 3A the pivoting flaps 21 of the ventilation element 20 are open and in FIG. 3B they are closed. The ventilation element 20 is actuated by an actuation member 26 which is an electric drive motor in this example. This electric drive motor can be a stepping motor which can variably set the pivoting extent of the individual pivoting flaps 21 by means of linear or rotary force.

Alternatively, the actuation member 26 can be configured as a bimetal element, around which a heating wire is wound, a piezoelectric actuator or an electromagnet. These exemplary actuation members can be actuated electrically in response to a control program which can be executed in a control unit of the drink preparation machine. To this end, one or a plurality of sensors can be arranged in the interior of the drink preparation machine, which supply signals to the control unit which provide information about the temperature and/or the moisture in the interior.

In an alternative embodiment, the actuation member can be a simple bimetal element which is for example attached to the housing of a heating element. The heating of the bimetal element produces a change in shape which can be transformed into a movement which is then transmitted mechanically to the pivoting flaps 21 in order to open them. Spring elements can be provided in the ventilation element 20, which exert a pressure force which assists the closing of the ventilation element.

Figure 4:
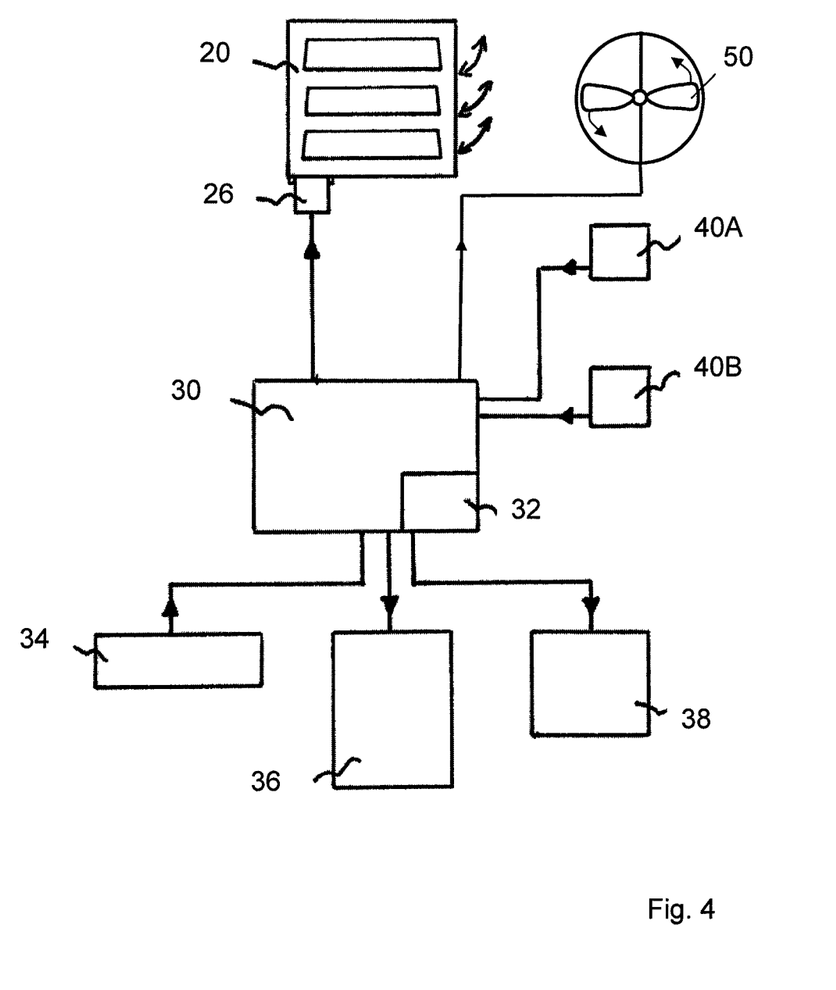
FIG. 4 shows a schematic diagram of components of the drink preparation machine.

FIG. 4 shows a schematic diagram of components of the drink preparation machine. A control unit 30 can control the entire drink preparation machine or part-regions thereof. The control unit 30 configured in such a manner that a control program 32 can be executed in it. The control unit 30 receives control signals which are entered by a user by means of a control panel 34. The user can enter commands regarding the requirement for coffee quantity, coffee strength etc., and finally a start command for preparing the coffee by means of the control panel 34. The control program 32 controls the control unit 30 for emitting corresponding signals to for example a brewing module 36 and/or a steam preparation unit 38 for preparing steam for foaming milk or to discharge hot water for tea, for example. The control unit 30 likewise receives signals from a temperature sensor 40A and a moisture sensor 40B. These signals provide information on the temperature and the moisture in the interior of the drink preparation machine. The control unit 30 is furthermore connected to the actuation member 26 of the ventilation element 20. The control program 32 decides whether the ventilation element 20 should be opened or closed in response to the input signals. In response to this decision, the control unit 30 outputs corresponding signals to the actuation member 26 of the ventilation element 20.

Depending on the temperature and moisture, the pivoting flaps 21 of the ventilation element 20 can also be partially opened or closed. An optimal ventilation of the interior of the drink preparation machine is thus always ensured in a simple and cost-effective manner.

The openings 24 can also be configured in such a manner that the flow cross section of the respective opening 24 is variable, and a change in the flow cross section can be controlled. To this end, the respective opening 24 can for example be realized in the form of an opening which is formed in the outer housing of the drink preparation machine 10 and can be closed by means of an adjustable closure element, with it being possible to control the respective position of the closure elements for example with the aid of the control unit 30 (nor shown in FIG. 4), in order to set or change suitably the flow cross section of the respective opening 24. The respective air flow in the interior of the drink preparation machine 10 can be controlled by a controlled change in the flow cross section of the respective opening 24, for example as a function of signals of the temperature sensor 40A and/or of the moisture sensor 40B. The air flow in the interior can also be controlled at least temporarily exclusively by controlling the momentary size of the flow cross section of the respective opening 24, for example during a period in which the respective pivoting flaps 21 of the ventilation element 20 assume a predefined position and in which the ventilation element 20 consequently is situated in the same state in each case.

As shown in FIG. 4, in one embodiment of the drink preparation machine 10, one or a plurality of ventilators 50 can (optionally) be connected to the control unit 30, with the respective ventilator 50 being used to generate an air flow which contributes to the ventilation of the interior of the drink preparation machine 10 and being arranged in the interior of the drink preparation machine 10 for this purpose. A ventilator 50 can for example be arranged in the vicinity of the ventilation element 20 (for example below the ventilation element 20) in such a manner that the air flow which can be generated with the ventilator 50 can flow through the ventilation element 20. Alternatively or additionally to the above-mentioned ventilator 50, a ventilator 50 can be arranged for example in the vicinity of the respective opening 24 (for example above the respective opening 24) in such a manner that the air flow which can be generated with this ventilator 50 can flow through the respective opening 24. The operation of the respective ventilator 50 can be controlled by means of the control program 32 so that the respective ventilator 50 can be switched on or off or influenced in another manner (for example with respect to the quantity of air supplied per unit time) correlated in time with an actuation of the ventilation element 20 and/or with a change in the flow cross section of one of the openings 24, or correlated in time with a certain operating state of the drink preparation machine 10 (for example correlated with the preparation of a drink).

In the embodiment according to FIG. 4, the control program 32 is set up in such a manner that the respective ventilator 50 can be actuated—analogously to the actuation of the ventilation element 20—as a function of an operating state of the drink preparation machine 10 and/or of a time function and/or of a predefined threshold function and/or as a function of signals of at least one of the sensors 40A or 40B. For example, the duration of a time span during which the respective ventilator 50 should be switched on or off can be defined by the specification of a time function. For example, threshold values for certain parameters (such as temperature or humidity in the interior) can be defined by the specification of a threshold function, with the respective threshold determining that the respective ventilator 50 is switched on or off or is otherwise influenced when the respective operating parameter exceeds or falls below one of the respectively defined thresholds.

That which is claimed is:

1. A drink preparation machine comprising:
   an outer housing comprising at least one ventilation element configured to ventilate an interior, wherein the interior is enclosed by the outer housing and, in the interior, is arranged at least one of: a heating element for heating water, a brewing module, or a steam preparation unit for preparing steam or discharging hot water,
   the at least one ventilation element being configured to be actuatable to open and close variably;
   a moisture sensor arranged in the interior for measuring a moisture of the interior; and
   an actuation member being configured to actuate the at least one ventilation element to variably adjust an opening extent of the at least one ventilation element in response to at least one of: a temperature in the interior reaching a temperature threshold, moisture in the interior reaching a moisture threshold, or the expiry of a predefined time span, wherein the at least one ventilation element is arranged in an upper closure lid of the outer housing, and wherein the at least one ventilation element defines a ventilation opening and a plurality of pivotable flaps.

2. The drink preparation machine according to claim 1, wherein an outer side of the ventilation element in the closed state forms a flat, continuous surface which connects to an adjacent outer surface of the outer housing.

3. The drink preparation machine according to claim 1, wherein at least one opening is provided in the outer housing, wherein the at least one ventilation element and the at least one opening are arranged in such a manner that a thermal convection of external air through the interior is produced when the ventilation element is open.

4. The drink preparation machine according to claim 3, wherein the at least one opening is arranged in a lower region of the outer housing.

5. The drink preparation machine according to claim 3, wherein the at least one opening has a flow cross section that is configured to be changeable by an adjustable closure element configured to close the at least one opening, and wherein a change of the flow cross section is controlled by controlling a size of the flow cross section.

6. The drink preparation machine according to claim 1, wherein the actuation member is an electrical drive motor or a piezoelectric actuator or an electromagnet or a bimetal element or a bimetal element around which a heating wire is wound.

7. The drink preparation machine according to claim 1, wherein the actuation member is configured to actuate the ventilation element in response to an operating state of the drink preparation machine.

8. The drink preparation machine according to claim 1, wherein the actuation member is configured to be electrically actuatable in response to a control program which is configured to be executable in a control unit of the drink preparation machine.

9. The drink preparation machine according to claim 8, wherein the control program is configured to actuate the actuation member as a function of at least one of: a time function, a threshold function, or a function of signals of at least one sensor.

10. The drink preparation machine according to claim 1 further comprising a ventilator arranged in the interior, wherein the ventilator is configured to generate an air flow which contributes to ventilation of the interior, wherein the ventilator is configured to be actuatable by means of a control program which is configured to be executable in a control unit of the drink preparation machine as a function of at least one of: an operating state of the drink preparation machine, a time function, a threshold function, or a function of signals of at least one sensor.

11. The drink preparation machine according to claim 10, wherein the sensor is a temperature sensor and/or a moisture sensor.

12. The drink preparation machine according to claim 1, wherein the actuation member is configured to open the at least one ventilation element when the temperature in the interior exceeds a first temperature threshold.

13. The drink preparation machine according to claim 12, wherein the actuation member is configured to close the at least one ventilation element when the temperature in the interior falls below a second temperature threshold being lower than the first temperature threshold.

14. The drink preparation machine according to claim 1, wherein the actuation member is configured to open the at least one ventilation element when the moisture in the interior exceeds a first moisture threshold.

15. The drink preparation machine according to claim 14, wherein the actuation member is configured to close the at least one ventilation element when the moisture in the interior falls below a second moisture threshold being lower than the first moisture threshold.

16. A method for ventilating an interior of a drink preparation machine, wherein the interior is enclosed by an outer housing, wherein the outer housing comprises at least one ventilation element being configured to be actuatable to open and close variably, wherein the drink preparation machine includes a moisture sensor arranged in the interior for measuring a moisture of the interior, wherein the at least one ventilation element is arranged in an upper closure lid of the outer housing, and wherein the at least one ventilation element defines a ventilation opening and a plurality of pivotable flaps, the method comprising:
- operating in the interior of the drink preparation machine at least one of: a heating element for heating water, a brewing module, or a steam preparation unit for preparing steam or discharging hot water; and
- causing actuation of the at least one ventilation element with an actuation member to variably adjust an opening extent of the at least one ventilation element in response to at least one of: a temperature in the interior reaching a temperature threshold, moisture in the interior reaching a moisture threshold, or the expiry of a predefined time span.

* * * * *